Figure 1:
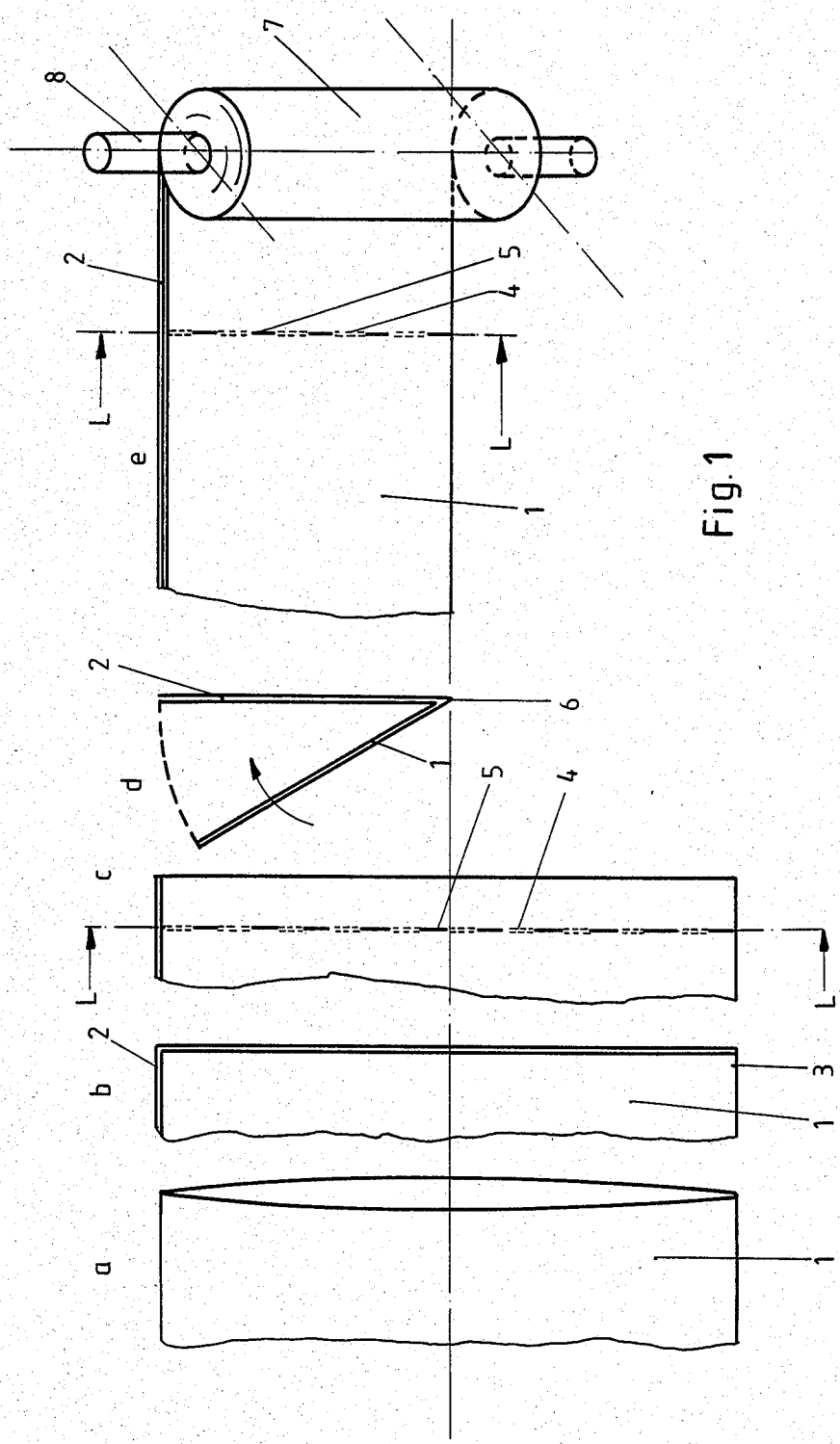

United States Patent [19]

Horn

[11] Patent Number: 4,530,732
[45] Date of Patent: Jul. 23, 1985

[54] METHOD OF MAKING EXTRUDABLE THERMOPLASTIC MOLDING MATERIAL FOR MANUFACTURING PLASTIC SHEETING USED IN PROTECTIVE COVERS, ESPECIALLY FOR VEHICLES AND PARTS THEREOF

[76] Inventor: Jörg Horn, Sechsschimmelgasse 8/30, A- 1090 Wien, Fed. Rep. of Germany

[21] Appl. No.: 476,220

[22] Filed: Mar. 17, 1983

[30] Foreign Application Priority Data

Mar. 20, 1982 [EP] European Pat. Off. ....... 82 102302.5

[51] Int. Cl.³ .............................................. B29D 7/16
[52] U.S. Cl. ............................. 156/244.18; 156/253; 264/146; 264/150; 264/564; 264/331.17; 524/232
[58] Field of Search ........... 264/150, 146, 171, 331.17, 264/230, 22, 331.15, 563–564, 248; 524/232; 156/253, 244.18, 24.13

[56] References Cited

U.S. PATENT DOCUMENTS

| | | | |
|---|---|---|---|
| 3,286,005 | 11/1966 | Cook | 264/563 |
| 3,299,194 | 1/1967 | Golike | 264/565 |
| 3,645,822 | 2/1972 | Widiger et al. | 156/243 |
| 3,679,126 | 7/1972 | Lake | 264/230 |
| 3,713,965 | 1/1973 | Widiger et al. | 264/171 |
| 3,891,737 | 6/1975 | Marsh et al. | 264/230 |
| 4,054,474 | 10/1977 | Collins et al. | 264/230 |
| 4,247,509 | 1/1981 | Talbot | 264/230 |
| 4,277,594 | 7/1981 | Matthews et al. | 264/564 |
| 4,327,009 | 4/1982 | Allen et al. | 264/210.6 |
| 4,394,474 | 7/1983 | McKinney et al. | 264/210.6 |

FOREIGN PATENT DOCUMENTS

| | | | |
|---|---|---|---|
| 57-144717 | 9/1982 | Japan | 264/230 |
| 816931 | 7/1959 | United Kingdom | 264/150 |

*Primary Examiner*—Jeffery Thurlow
*Attorney, Agent, or Firm*—Max Fogiel

[57] ABSTRACT

Extrudable thermoplastic molding material for manufacturing plastic sheeting used in protective covers, especially for vehicles and parts thereof, characterized in that the extrudable thermoplastic molding material for the manufacture of plastic sheeting is a combination of different polyethylenes and olyamides consisting of 1. at least 45% by weight of linear polyethylene (LLDPE),
2. 10–50% by weight of high-pressure polyethylene (LDPE),
3. 0.5–10% by weight of low-pressure polythylene (HDPE),
4. 0.1–5% by weight of olyamides or eurocamides and natural silica, and
5. up to 5% by weight of fatty-acid esters, dyes, synthetic silicic acid, stabilizers, and processing agents, with the sum of 1–5 always being 100% by weight and method of manufacturing from this material a plastic sheeting that is highly elastic, grip-resistant, and smooth.

4 Claims, 5 Drawing Figures

METHOD OF MAKING EXTRUDABLE THERMOPLASTIC MOLDING MATERIAL FOR MANUFACTURING PLASTIC SHEETING USED IN PROTECTIVE COVERS, ESPECIALLY FOR VEHICLES AND PARTS THEREOF

The invention is an extrudable thermoplastic molding material for manufacturing plastic sheeting used in protective covers, especially for vehicles and parts thereof, and discloses both a method for preparing the molding material and protective cover made from the plastic sheeting. Protective covers of this type made from conventional plastic sheeting, usually from pure high-pressure polyethylene or pure low-pressure polyethylene are used for example in shops or storage sites for covering vehicular seats, steering wheels, wheels, or whole vehicles as well as for upholstered furniture etc. to keep them from getting dirty and preserve their function. A number of disadvantages considerably affect their use. First, since the size of the protective cover must be adapted to the particular shape and dimensions of the article to be covered, every business must keep a large number of different covers on hand, which necessitates considerably larger storage facilities. Second, known protective covers do not stand up to mechanical stress very well and rip easily. Finally, the sheeting usually employed is relatively thick, requiring a lot of material, which makes the covers hard to handle and increases both their weight and their price.

The invention is intended to eliminate all these disadvantages and provide a plastic sheeting for the manufacture of all types of protective covers that will be very thin, that will stand up to maximum mechanical stress, and that can be stretched in such a way that a cover made out of it can be pulled over and fitted to articles of a large range of shapes and dimensions without the exertion of too much force and without ripping, maintaining a tight enough fit to provide optimum protection throughout the use of the cover, during the repair of a motor vehicle for example.

This objective is attained in accordance with the invention in that the extrudable thermoplastic molding material for the manufacture of plastic sheeting is a combination of different polyethylenes and olyamides consisting of 1. at least 45% by weight of linear polyethylene (LLDPE),
2. 10–50% by weight of high-pressure polyethylene (LDPE),
3. 0.5–10% by weight of low-pressure polyethylene (HDPE),
4. 0.1–5% by weight of olyamides or eurocamides and natural silica, and
5. up to 5% by weight of fatty-acid esters, dyes, synthetic silicic acid, stabilizers, and processing agents, with the sum of 1–5 always being 100% by weight.

The method of manufacturing plastic sheeting from these materials is characterized by mixing the constituents in a known way in a constituent mixer, plasticizing the mixture, and extruding it into highly elastic, smooth, and extremely thin sheeting distinguished by a certain grip resistance and stiffness that, because a tube of the sheeting is extremely easy to open out, makes the utilization of delicate sheeting practical for the first time.

The sheeting in accordance with the invention can be stretched to a great extent, to about 20–50% of its size, and can be extruded out extremely thin, to about 8 $\mu$m. It will, however, always be stiff enough to ensure adequate grip resistance, which is a prerequisite for practical utilization.

This and easily handled protective covers can be made from the sheeting in accordance with the invention that are large enough to pull over articles of different dimensions and shapes almost without ripping. This will tremendously simplify the problem of storing protective coverings in workshops. The strictly material costs of the sheeting will be significantly reduced, which will in itself save energy. It is not only material, however, but also shipping weight that will be saved, which will decrease the price in relation to conventional sheeting. A protective cover made from such plastic sheeting, especially for vehicular seats and other vehicle parts as well as for whole vehicles, is characterized in that the sheeting can be stretched to a great extent, to about 20–50% of its size, and will be extremely thin, as thin as about 8 $\mu$m.

To facilitate storage and handling, especially the stocking, of the protective covers in accordance with the invention, a tube of sheeting is extruded to a length that is as long as a large number of protective covers and cut to a desired length. The two halves of the web, which now lie flat against each other, are then joined by means of transverse hot-bonded seams with perforations or by means of what are called heat-bonded separation seams at intervals corresponding to the length of the finished covers. The tubular blank can then be folded longitudinally and wound into a supply roll, from which the individual protective covers can easily be separated as needed along the transverse seams or perforations.

Figure 3:
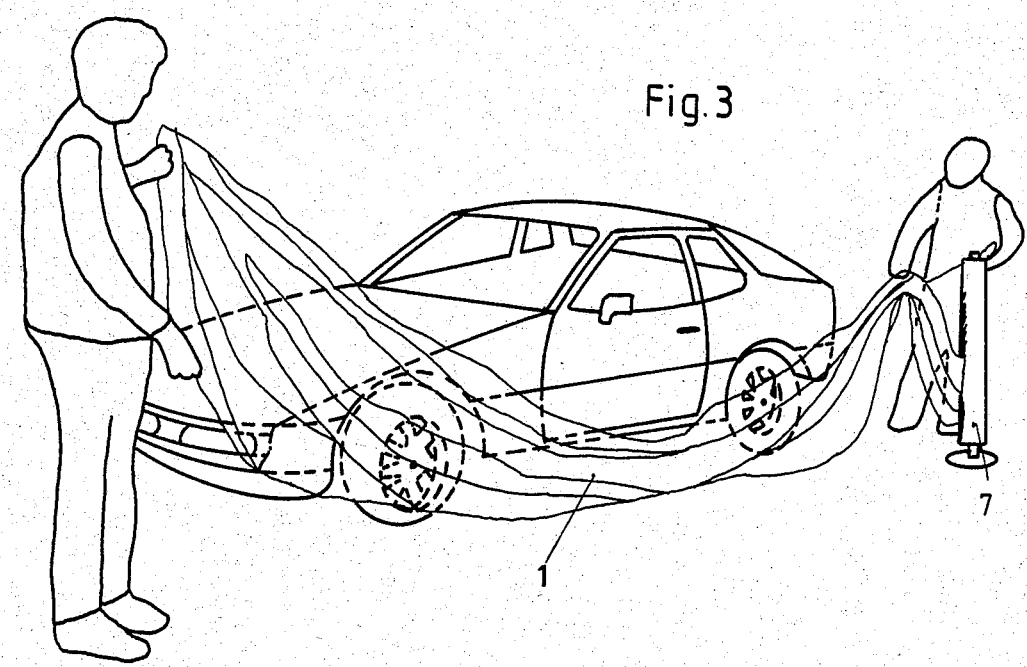
Figure 2:
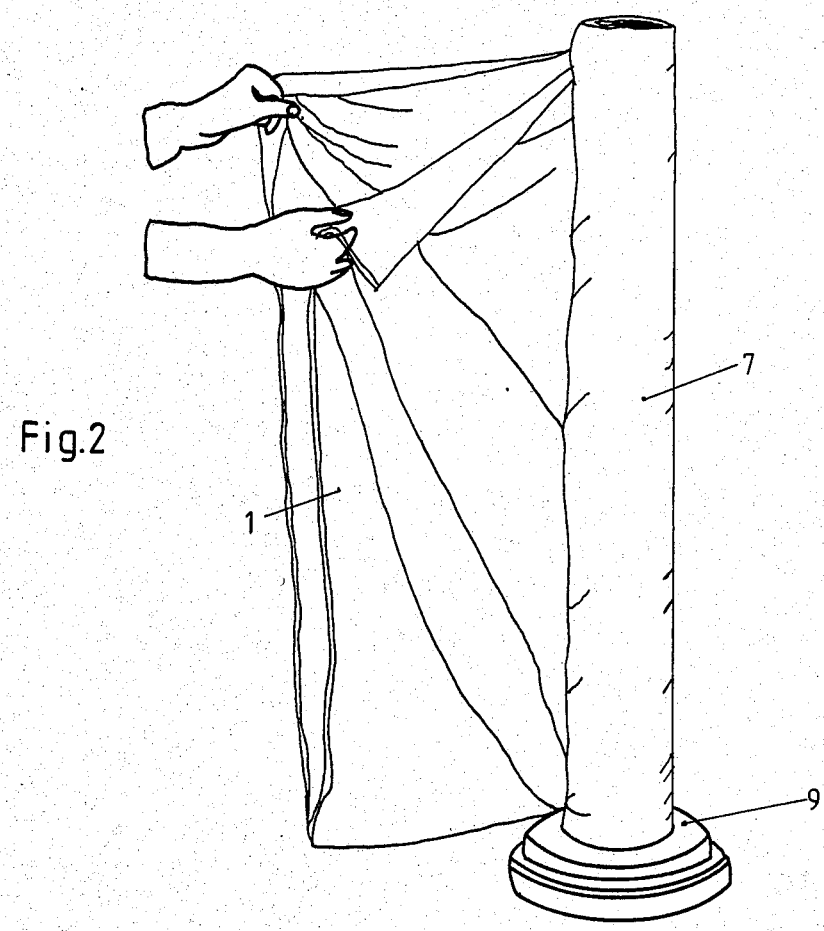
Figure 4:
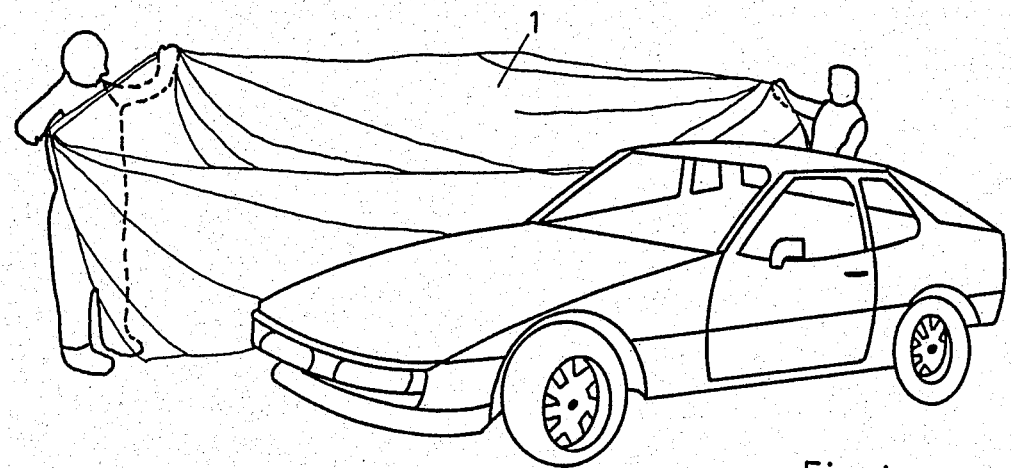
Figure 5:
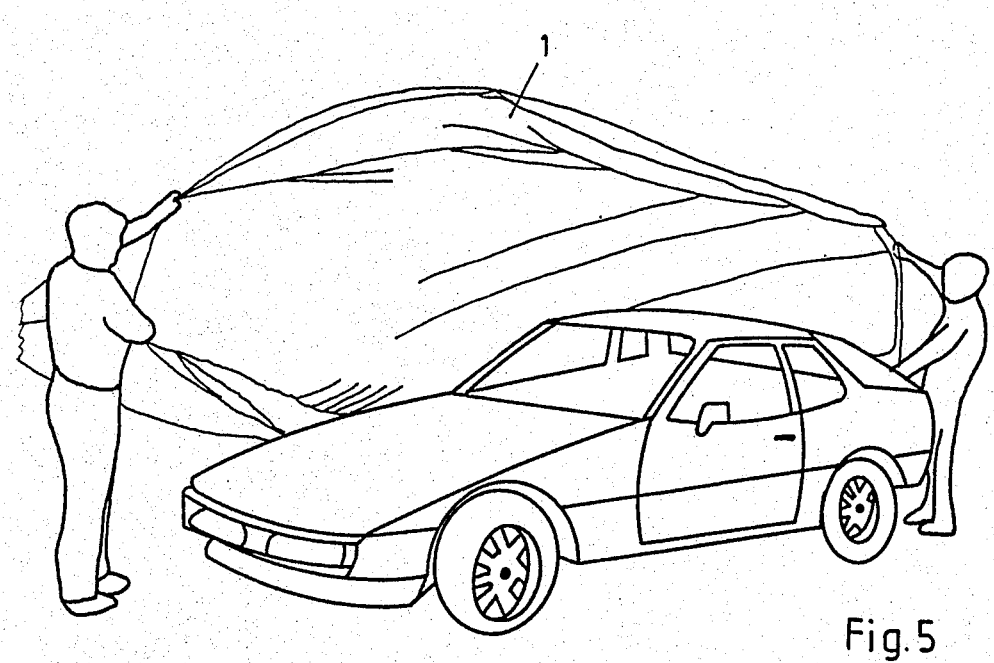

The theory behind the invention permits of an extremely wide range of possible embodiments, one of which will now be specified with reference to the drawings, in which FIG. 1 is a diagram of the structure of a supply roll for protective covers made from a tube of extruded sheeting, FIG. 2 shows a partly unwound supply roll, and FIGS. 3–5 illustrate how a protective cover separated from a supply roll like that in FIG. 2 is employed to completely cover a vehicle.

An extremely thin-walled and highly elastic tube 1 of plastic sheeting (detail a in FIG. 1) is extruded from the mixture of various types of polyethylene, olyamides, fatty-acid esters, dyes, stabilizers, etc. specified in the introduction and claims. Tube 1 is layed flat and slit lengthwise along one side 2 (FIG. 1, detail b) leaving the other folded side 3 intact. Transverse heat-bonded seams 4 and perforations 5 are now made along the tube at intervals that correspond to the length L of one protective covering (FIG. 1, detail c). Tube 1 is now folded in the middle longitudinally (FIG. 1, detail d) and finally wound into a roll 7 on a shaft 8 (FIG. 1, detail e). Transverse seams 4 and 5 can be produced in a wide range of ways, in the form of transverse hot-bonded seams with perforations or of what are called heat-bonded separation seams for example.

The resulting supply roll 7 can vary in accordance with the size of the individual protective covers. When the covers are intended for complete vehicles, 25–100 covers can easily be combined in one roll 7 and separated from it individually as needed. If the covers are intended for vehicular seats etc. on the other hand, up to 1000 can be accommodated on one roll. Since the plastic sheeting is very thin, say 10 $\mu$m or even less, the weight of such a roll will be relatively low in spite of the large number of covers it contains.

In use, supply roll 7 is mounted, vertically for example, on a base 9. The individual protective covers can easily be removed from it and separated along seams 4 or perforations 5. With the open side up as illustrated in FIG. 4, the protective cover is then pulled over the whole vehicle as illustrated in FIG. 5. As the result of is high level of elasticity, 20-50%, the cover can be pulled over vehicles of an extremely wide range of dimensions. The same is true of the smaller covers intended for vehicular seats, furniture, or other articles. One size of cover can be pulled over vehicle parts or other articles of various dimensions. The high elasticity of the smooth sheeting allows parts of any size to be covered without the sheeting ripping or otherwise getting damaged. Winding the sheeting in rolls facilitates not only storage but also the transportation and shipping of the covers.

I claim:

1. A method for producing an extrudable thermoplastic mass to make plastic sheet for the fabrication of protective coverings, particularly for vehicles and vehicle parts, comprising the steps of:

mixing in a constituent mixer at least 45% by weight of linear polyethylene, (LLDPE), 10-50% by weight of high-pressure polyethylene (LDPE), 0.5-10% by weight of low-pressure polyethylene (HDPE), 0.1-5% by weight of olyamides or eurocamides and natural silica, and up to 5% by weight of fatty-acid esters, dyes, synthetic silicic acid, stabilizers, and processing agents, the sum of the mixed constituents being always 100% by weight, plasticizing said mixture, and extruding the plasticized mixture into a highly elastic, grip-resistant, smooth mass having high puncture resistance and minimum thickness.

2. A method as defined in claim 1, wherein said mixture is extruded into a tube of sheeting to a length that is as long as a plurality of protective covers, cutting the tube of sheeting along its length; joining the two webs lying against each other by a welded seam, and perforating at intervals corresponding to the length of the protective cover so that the covers can be separated.

3. A method as defined in claim 2, including the steps of folding the tube with seams and perforations longitudinally, and winding into a supply roll from which individual protective covers may be severed as needed.

4. A method as defined in claim 2, wherein said sheeting is stretchable to substantially 20-50% of its size, said sheeting being extrudable to a thickness of substantially 8 $\mu$m.

* * * * *